United States Patent [19]

Schwimmer et al.

[11] Patent Number: 5,238,444
[45] Date of Patent: Aug. 24, 1993

[54] APPARATUS FOR FORMING LOOPS ON A SAUSAGE SEALING MACHINE

[76] Inventors: Uwe Schwimmer, Am Sportplatz 62, 2056 Glinde, Fed. Rep. of Germany; Alfons Meyer, Hermann Burgdorf Str. 63, D-2110 Buchholz i.d. Nordheide, both of Fed. Rep. of Germany

[21] Appl. No.: 926,508

[22] Filed: Aug. 6, 1992

[51] Int. Cl.⁵ .......................................... A22C 11/12
[52] U.S. Cl. .......................................... 452/48; 452/47
[58] Field of Search .......................... 452/48, 47, 46

[56] References Cited

U.S. PATENT DOCUMENTS

| | | |
|---|---|---|
| 2,406,163 | 8/1946 | Prohaska ............................ 452/48 |
| 3,483,801 | 12/1969 | Kupcikevicius ...................... 93/6 |
| 3,951,262 | 4/1976 | Niedecker ......................... 206/343 |
| 4,165,593 | 8/1979 | Niedecker ......................... 53/413 |
| 4,308,022 | 12/1981 | Inoue ................................. 493/214 |
| 4,345,411 | 8/1982 | Niedecker ......................... 53/134 |
| 4,401,329 | 8/1983 | Pedruia ............................. 452/48 |
| 4,541,660 | 9/1985 | Pujol ................................. 452/48 |
| 4,573,241 | 3/1986 | Niedecker ......................... 17/44.2 |
| 4,720,010 | 1/1988 | Bertram ............................ 206/345 |
| 5,067,313 | 11/1991 | Evans ............................... 53/576 |
| 5,109,648 | 5/1992 | Evans ............................... 53/134.1 |
| 5,156,567 | 10/1992 | Gammon et al. .................. 452/46 |

FOREIGN PATENT DOCUMENTS

| | | | |
|---|---|---|---|
| 104152 | 9/1926 | Austria ............................... 452/46 |
| 2559171 | 10/1976 | Fed. Rep. of Germany ........ 452/48 |
| 3244775 | 6/1984 | Fed. Rep. of Germany . | |
| 3441303 | 5/1986 | Fed. Rep. of Germany ........ 452/48 |

*Primary Examiner*—Willis Little
*Attorney, Agent, or Firm*—Allegretti & Witcoff, Ltd.

[57] ABSTRACT

The invention relates to an apparatus for forming loops on a stuffed-casing-product sealing machine. For this purpose a loop former is provided which, in conjunction with a line guide and a deflector, forms loops, which can be subsequently tied and separated by a known tying head. The apparatus can easily be fitted in situ to a sausage clipper.

4 Claims, 8 Drawing Sheets

FIG. 10

APPARATUS FOR FORMING LOOPS ON A SAUSAGE SEALING MACHINE

BACKGROUND OF THE INVENTION

The invention relates to a loop forming apparatus to be used in cooperation with a sausage sealing machine.

German utility Model 85 16 678.2 already discloses a machine for sealing sausage casings with which a sausage strand several meters long can be split up into a plurality of sausage portions and sealed by pairs of clips. In conjunction with such sausage sealing machines, it is also known to insert previously produced loops in the gathering plates of the known machine and to fix them with clips.

A disadvantage of the known, previously produced loops is that they are relatively complicated, because they must be supplied to the sausage sealing machine on a support strip specially prepared for this purpose. Consequently it is necessary to tie the loops at another point and then fix them on the carrier strip, e.g., by adhesive and then, at the sausage sealing machine, they must be removed from the carrier again by suitable gripping devices. It is also necessary to position the loops on the clipper.

The problem is therefore to provide a simple apparatus for producing loops, which can be installed on known sausage sealing machines, e.g., in accordance with German utility Model 85 16 678.2.

This problem is solved by the characterizing features of the present invention which provide an in situ fitted loop forming apparatus used in conjunction with a sausage sealing machine.

SUMMARY OF THE INVENTION

Briefly, the present invention relates to an apparatus for forming loops in association with a sealing machine or stuffed-casing products. More specifically, the invention relates to a loop forming apparatus including a line guide, a tying head to function in cooperation with the line guide in forming a tied loop, a loop former to engage with line fed from the line guide, and a deflector to move the line in an operative position in or out of the plane formed by the line guide.

In order to form a tied loop, a line is supplied from a braked reel to the line guide. The line guide maintains a forward and backward pivoting path to carry the line from the braked reel to the tying head, where the line is attached. Positioned between the line guide and the tying head is the loop former. The loop former is pivotally mounted in order to catch and support the line. Further, the loop former supports the line in recesses which are formed by projections which extend from the top sidewalls of the loop former. Subsequent to the line being positioned in the recesses, the loop is tied at the tying head.

Following the formation of the tied loop, the invention further provides severance or cutting of the completed tied loop from the line. After the severance of the tied loop, the invention further comprises a line remover to lift and transfer the tied loop away from the loop forming area. The method of operation of the present invention provides a means for the formation of tied loops on a stuffed casing product sealing machine which negates the need to produce the tied loops at a remote location, which conventionally requires carrier strips for the loops.

An advantage of the present invention is a loop forming apparatus which operates in situ in cooperation with a stuffed casing product sealing machine.

A further advantage of the present invention is a simple loop forming apparatus for producing tied loops.

Yet a further advantage of the present invention is a more efficient loop forming procedure to function in cooperation with a stuffed casing product sealing machine.

These and other objects, advantages and features of the invention will be set forth in the detailed description which follows.

BRIEF DESCRIPTION OF THE DRAWING

The invention is described in greater detail hereinafter relative to an embodiment and the attached drawings, wherein it is shown.

DESCRIPTION OF THE PREFERRED EMBODIMENT

Figure 1:
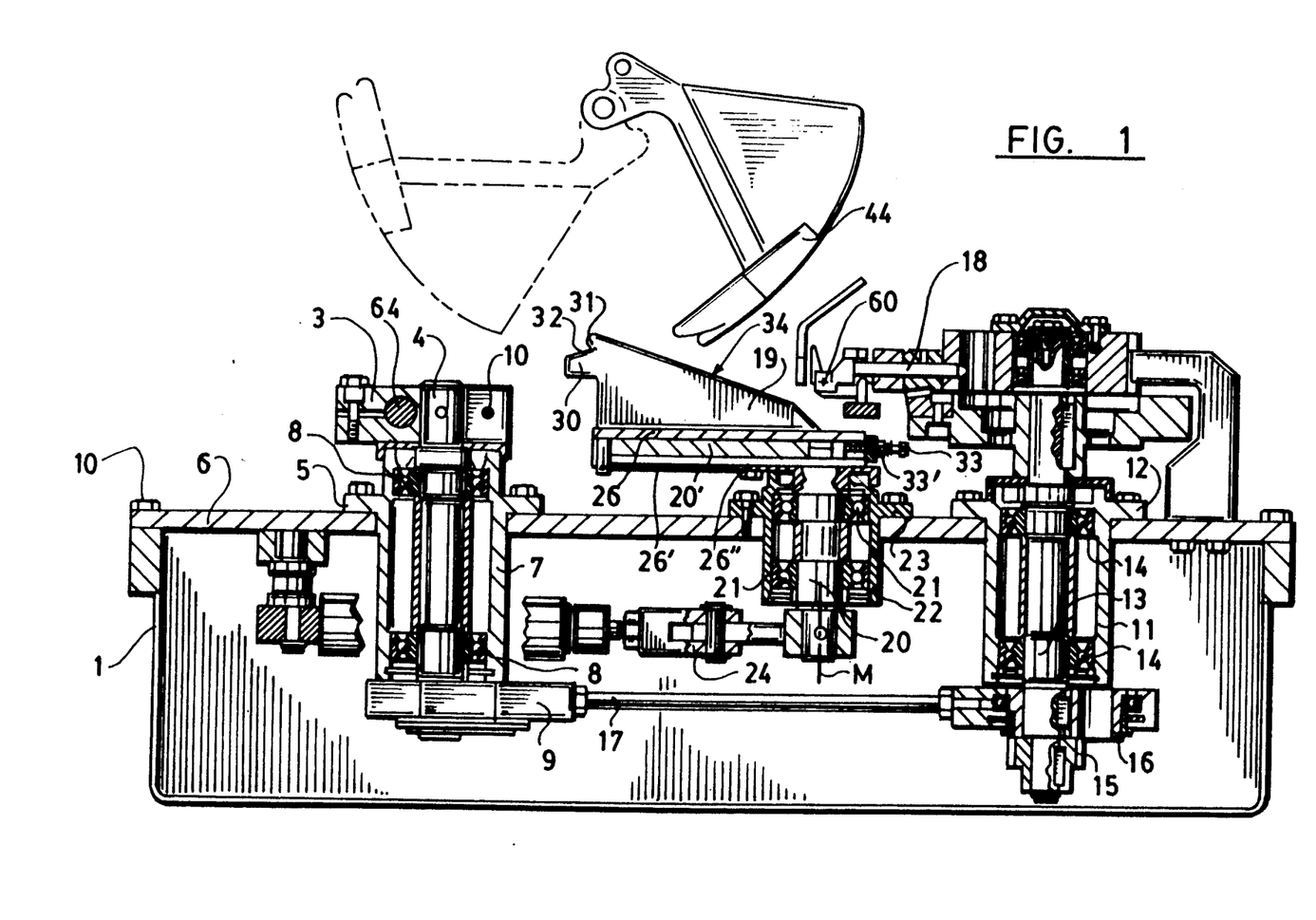
FIG. 1 is a side elevation of the loop forming apparatus, support base and line remover.

FIG. 1 shows a side elevation of the embodiment and major parts of the invention are shown in detail. Shown in FIG. 1 is a carrier plate 6, which seals a dish-shaped casing 1. The circumference of the carrier plate 6 is screwed by screws 10 to the dish-shaped casing 1. In the top, right-hand corner it is possible to see a first flange 5, which fixes a first bush 7 in the carrier plate 6 and here again standard screws 10 are provided. Through the bush 7 in FIG. 2 passes a line guide shaft 4 to which is clamped a clamp 3 with slot and screw 10. The clamp 3 carries a line guide 2, which is shaped like a hook extending over 90°. Such line guides are known to those skilled in the art, e.g., in conjunction with agricultural baling machines, in which round or parallelepipedic bales are joined together after formation. The line guide 2 secures at its tip 25 a line 55 supplied from a reel 65 and on rotating the line guide shaft 4 moves it to a bell 54, which is part of a tying head 18. The tying head 18 and the bell 54 are also known in connection with baling machines and do not form part of the present invention. Therefore details are not given in connection therewith, because they are known to those skilled in the art.

The line 55 supplied from the reel 65 is clamped in the bell 54 and is held at this position during the subsequent pivoting back movement of the thread guide 2. In the pivoting path of the line guide 2 is also provided a deflector 35, which will be described hereinafter in conjunction with FIGS. 2–10.

FIG. 1 also shows that, between the line guide 2 and the tying head 18 on carrier plate 6 is also provided a loop former 19, which is pivoted backwards and forwards between two positions C and D shown in FIGS. 2–10.

Figure 2:
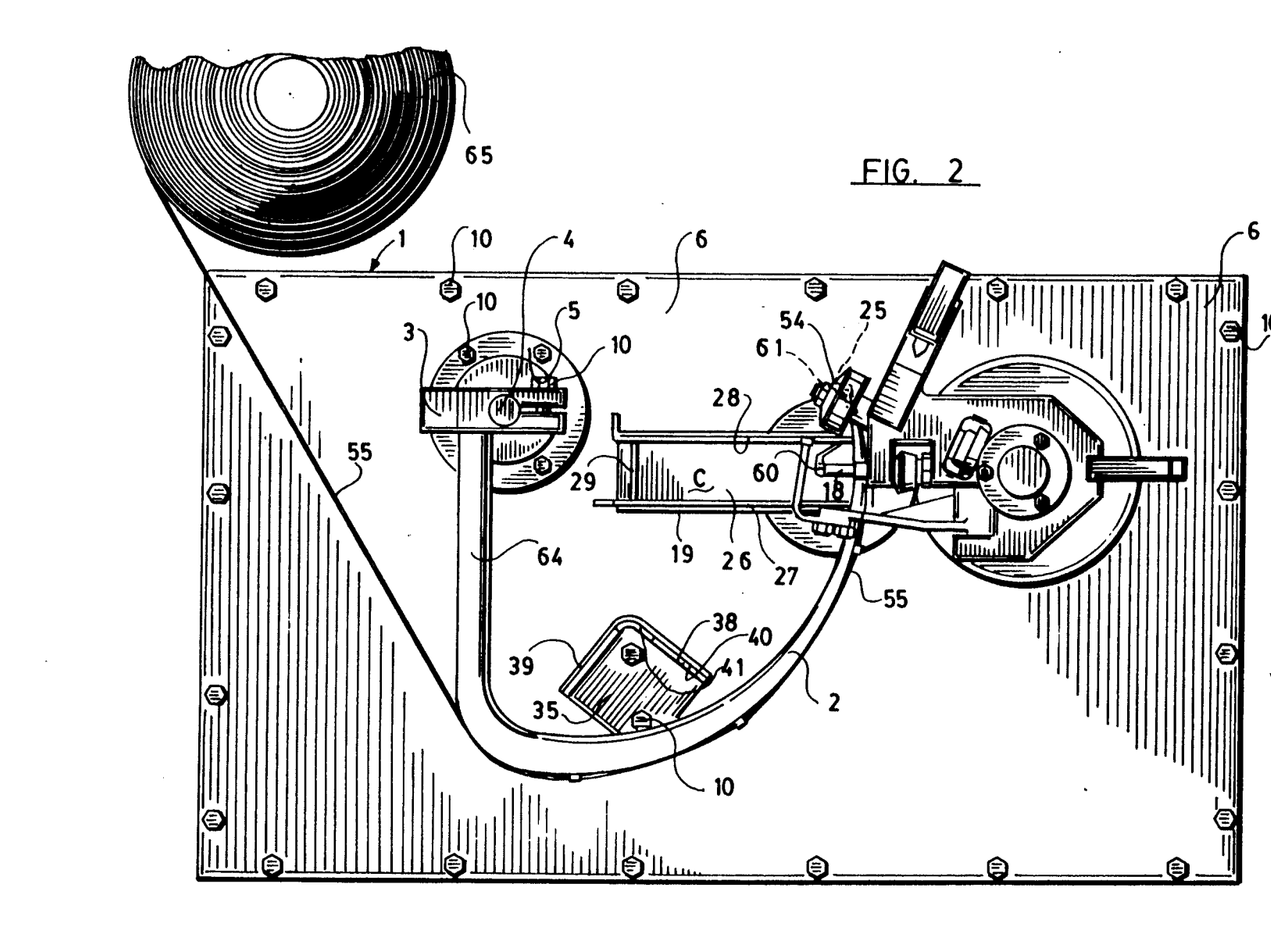
FIG. 2 is a top view of the loop forming apparatus with the line guide in a forward position and the loop former in a fully retracted position and disengaged with the line.
Figure 3:
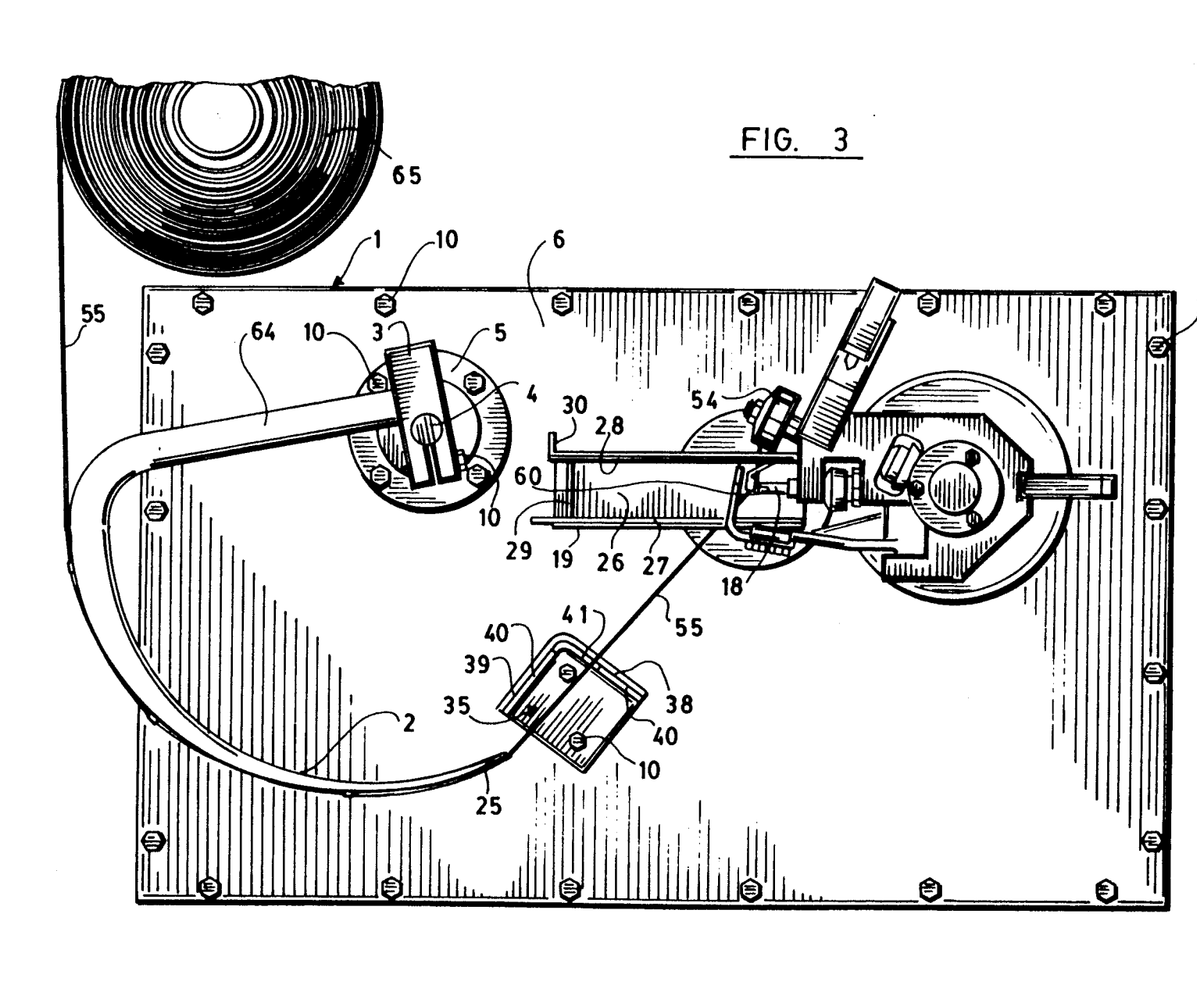
FIG. 3 is a top view of the loop forming apparatus with the line guide in the fully retracted position and the loop former in a partially retracted position disengaged with the line.

FIG. 2 is a top view of the loop forming apparatus. Shown in FIG. 2 is the coupling of the carrier plate 6 to the dish-shaped casing 1. The carrier plate 6 has a first bush 7, as shown in FIG. 1, for holding the line guide shaft 4, a second bush 11 for holding the tying head shaft 13 and a third bush 22 for holding the loop former shaft 20 with the aid of a first flange 5, or a second flange 12, or a third flange 23.

The first bush 7 carries first bearings 8, which mount in rotary manner the line guide shaft 4. At the free end of the line guide shaft 4, it is possible to see the clamp 3 clamped with the aid of the screw 10, which in turn fixes the line guide hook 64. Therefore, the line guide hook 64 is horizontal in FIG. 1, which corresponds to the forward position shown in FIG. 2, in which its tip 25 is engaged with the bell 54.

On the end of the line guide shaft 4, distal from the line guide 2, is provided an eccentric drive 9, which is coupled by means of a connecting rod 17 to an eccentric 16. The eccentric 16 is located on the tying head shaft 13, which are mounted with the aid of bearings 14 in the second bush 11. Onto the end of the tying head shaft 13 located in the casing 1 is a pinion 15, which transfers the driving movement to said shaft 13. Outside the casing 1, on the free end of the tying head shaft 3 is mounted the tying head 18 with all the associated parts, which are used in the manner known in the art in connection with baling machines for forming a knot in two yarn strands. The movements of the tying head 18 and the line guide 2 are coordinated by means of the connecting rod 17, the eccentric 16 and the eccentric drive 9.

Between the tying head 18 and the line guide 2 the loop former 19 is fitted to the free end of a loop former shaft 20, which is mounted by third bearings 21 in the third bush 22. As has already been stated, the third bush 22 is fixed with the aid of the third flange 23 in the carrier plate 6.

To the casing-side end of the loop former shaft 20 is connected a drive system 24, which in a manner known to those skilled in the art, is used for pivoting the loop former shaft 20 backwards and forwards between the two positions C and D as shown in FIGS. 2–10.

FIGS. 7–10 show that onto the outer end of the loop former shaft 20 is welded a carriage guide 20', on which slides as a carriage the loop former rear wall 26. A stop screw 33 with a retaining plate 33' is screwed to the loop former 19. A tension spring 26' draws the loop former 19 over a web 26'' against the carriage guide 20'. The carriage guide 20' is necessary so that the loop former 19 can move in opposition to the tension of the tension spring 26' during the tying process by approximately 5 mm in the direction of said tying head 18 due to the fact that the tying process requires line. When the line has been cut off, the spring moves the loop former 19 back to such an extent that the stop screw 33 again strikes against the carriage guide 20'. The rear wall 26 can be seen in FIGS. 7–10. It is shaped like a plate, which is at right angles to the axis of the loop former shaft 20 and therefore extends radially with respect to said shaft 20. On the rear wall 26 are provided, in spaced manner, two sidewalls 27, 28, the spacing namely being such that a line remover 44, shown in FIG. 1, can easily be moved between the left and right-hand sidewalls 27, 28 and can remove the loop formed through the cooperation between the line guide 2 and the tying head 18.

FIGS. 7–10 also show that the leading edges 34 of the sidewalls 27, 28 slope from top to bottom towards the rear wall 26, so that the sidewalls 27, 28 do not contact the tying head 18 during their pivoting movement. It is also possible to see that at the upper end of the sidewalls 27, 28, i.e., spaced with respect to the loop former shaft 20, are shaped a tab 30 and a projection 31, between which is formed a recess 32 for the insertion of the line 55.

Figure 4:
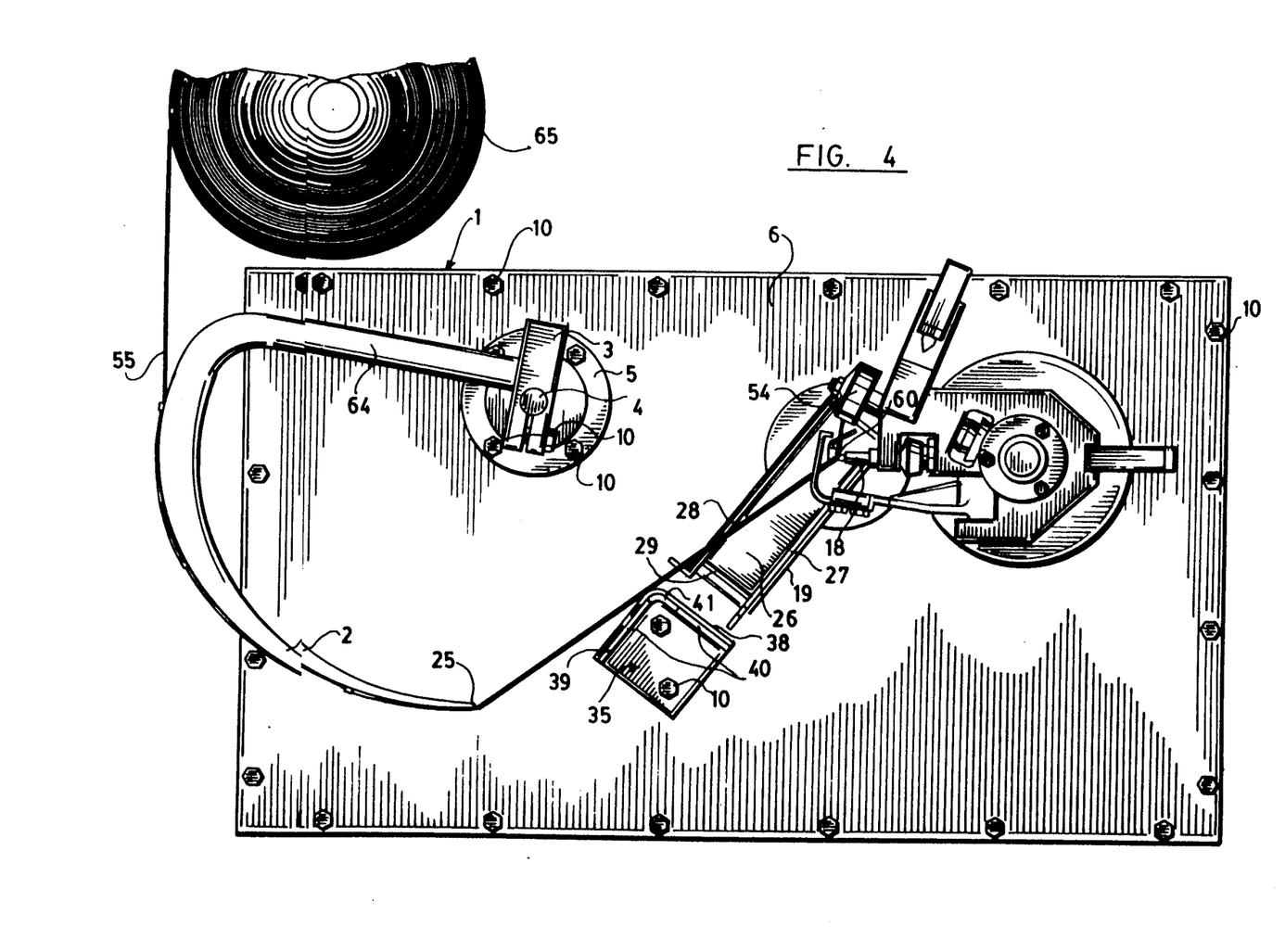
FIG. 4 is a top view of the loop forming apparatus with the line guide in the fully retracted position and with the loop former in an advanced position.
Figure 5:
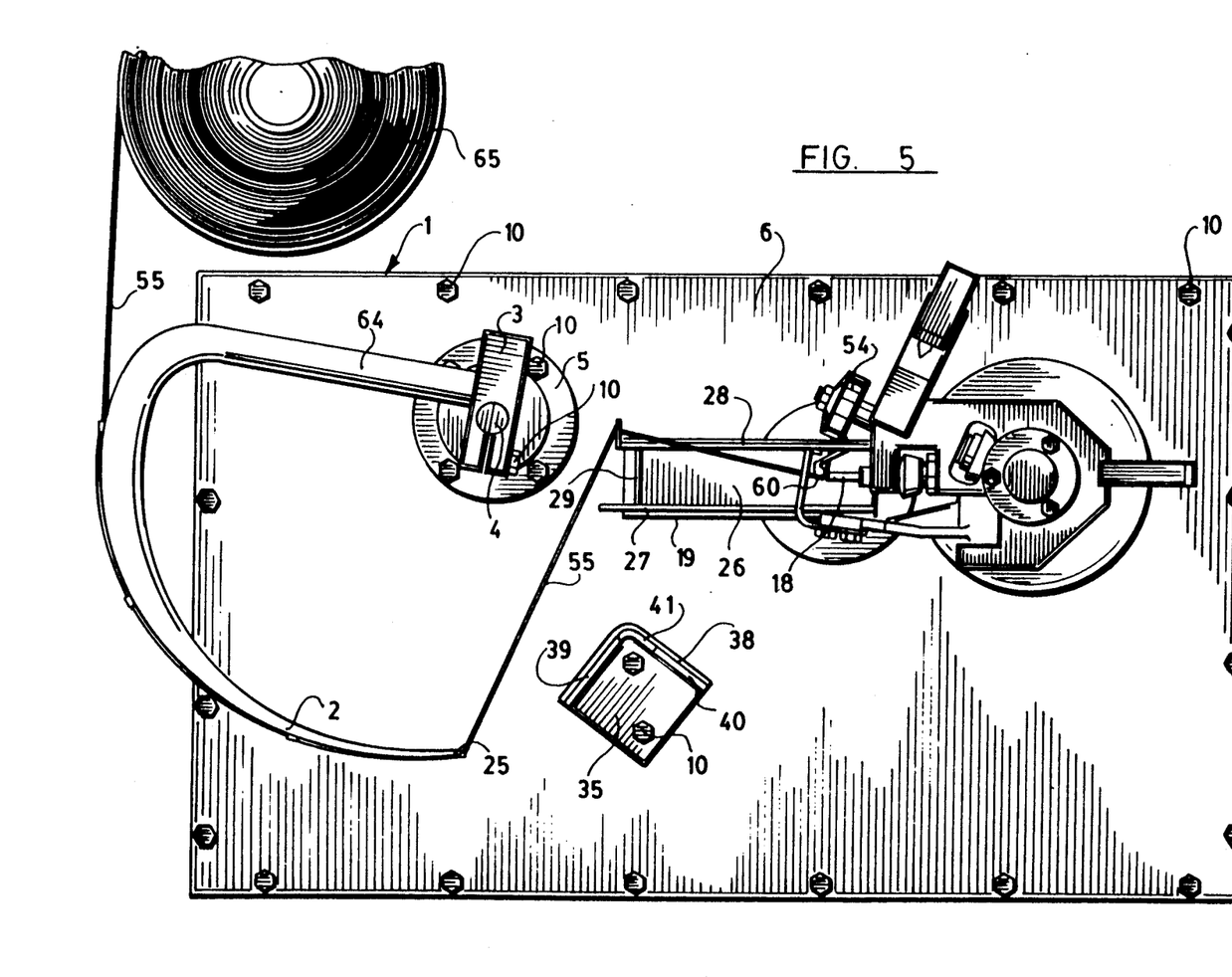
FIG. 5 is a top view of the loop forming apparatus with the line guide in a fully retracted position and the loop former is in a fully retracted position.
Figure 6:
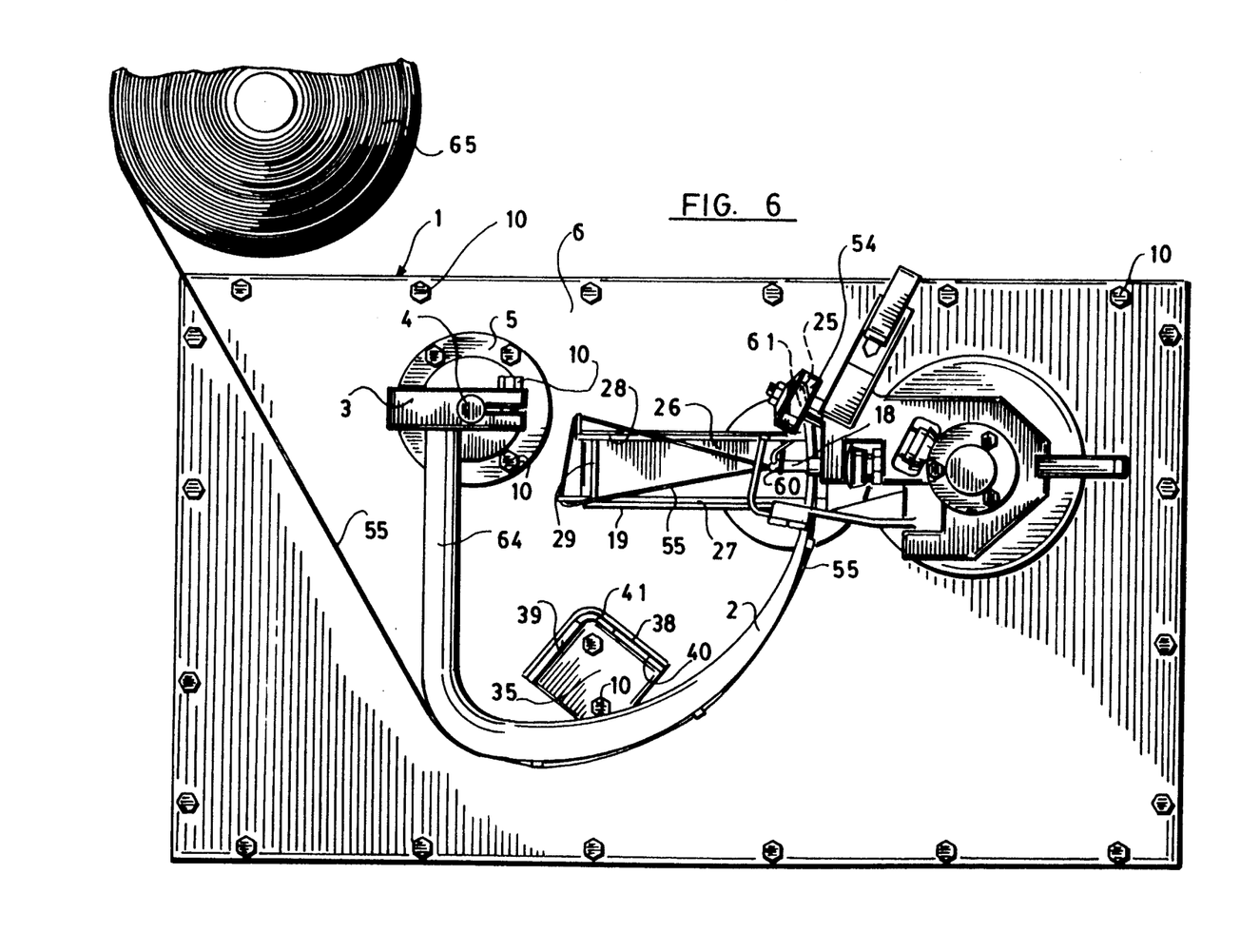
FIG. 6 is a top view of the line guide in a forward position and the loop former is in the fully retracted position engaged with the line.
Figure 7:
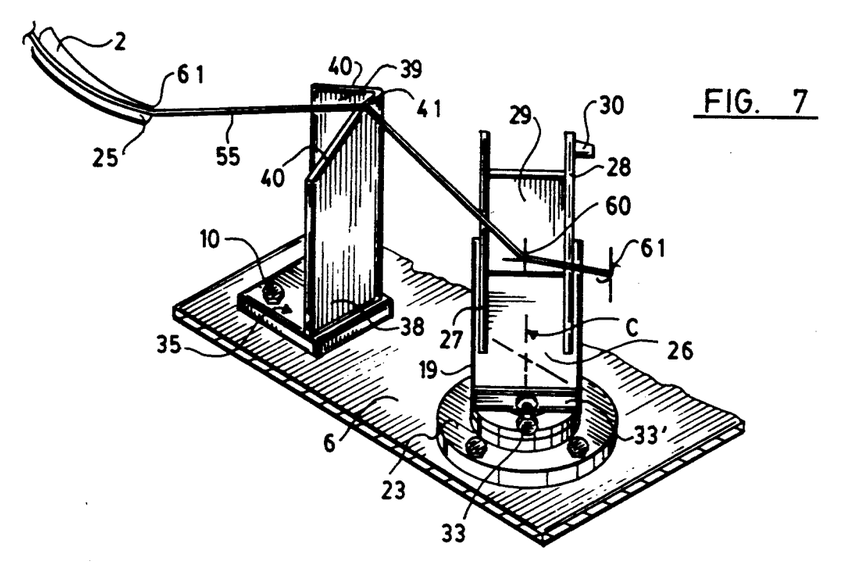
FIG. 7 is a perspective view of the loop former in a fully retracted position and the deflector supporting the line.

FIG. 4 shows the loop former 19 in a perspective view in position D, the casing 1 being assumed as horizontal, which constitutes a possible assembly position. However, only part of the roughly horizontally positioned carrier plate 6 is shown. It is therefore possible to gather how the loop former shaft 20 is guided by the third flange 23, which is screwed to the carrier plate 6 in a manner known to those skilled in the art.

Figure 8:
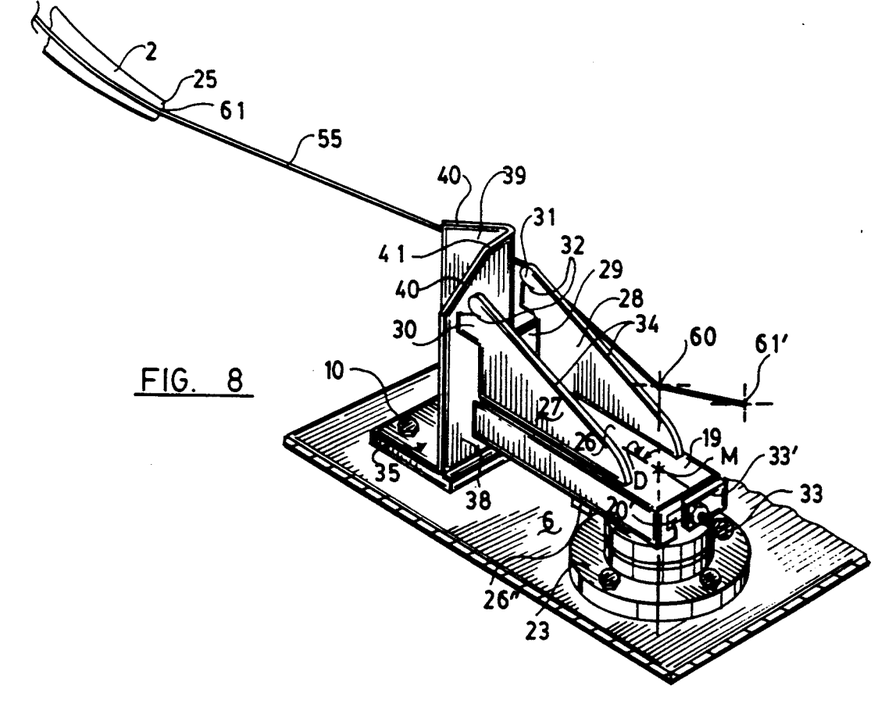
FIG. 8 is a perspective view of the loop former in a forward position and the deflector deflecting the line out of the path formed by line extending between the line guide and the tying head.
Figure 9:
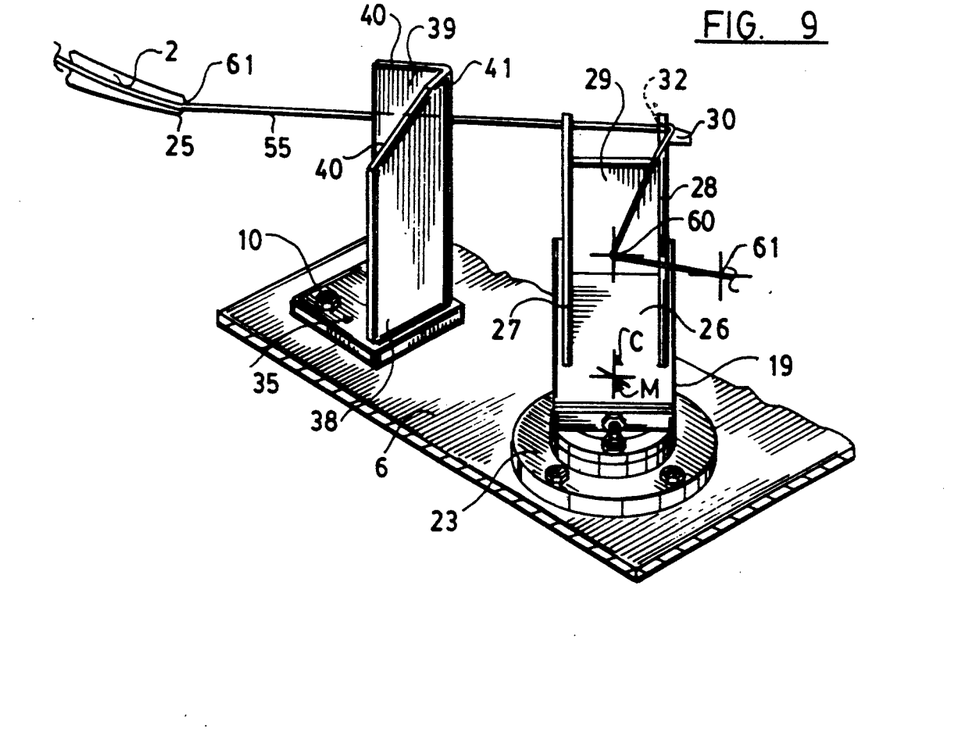
FIG. 9 is a perspective view of the loop former in the fully retracted position engaged with the line, the line supported by the tab extending from the loop former.
Figure 10:
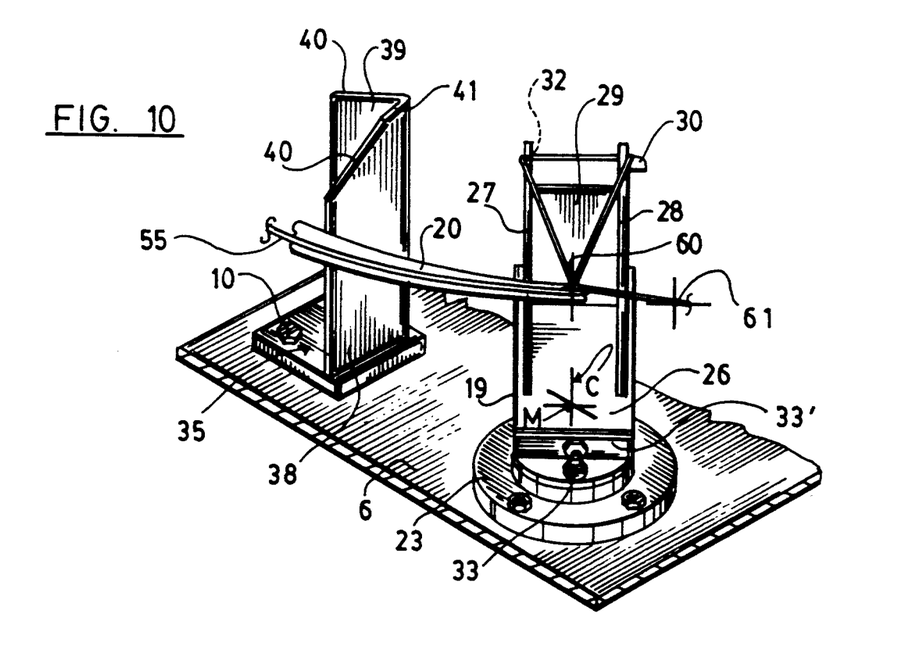
FIG. 10 is a perspective view of the loop former in a fully retracted position supporting a formed loop and the deflector is disengaged with the line.

Referring to FIG. 8 it is possible to see the location of the sidewalls 27, 28 on the rear wall 26, in such a way that the two sidewalls 27, 28 form a right angle with the rear wall 26 and are therefore in parallel planes to a plane through the axis M of the loop former shaft 20. It is also possible to see the bevel on the leading edges 34, which passes from the projections 31 in downwardly sloping manner towards the rear wall 26. It is also possible to see the recesses 32 for clamping the line 55.

FIGS. 2–10 also show how the loop former 19 can be pivoted about the axis M of the loop former shaft 20 between the positions C and D.

FIGS. 2–6 show the installation point of the deflector 35 on the carrier plate 6, namely above the loop former 19 in its advanced position D, in such a way that the vertical leg 39 of the angle 37 is roughly aligned with the right-hand sidewall 28, whereas the horizontal leg 38 runs parallel to the connecting web 29 of the loop former 19. Therefore the furthest forward connecting point 41 of the leading edges 40 is at a greater distance from the carrier plate 6 than the furthest point of the projections 31, so that a line 55 tensioned from the bell 54 to the connecting point 41 is located over the projections 31 or, in the representation according to FIG. 4, is located further forward and the loop former 19 can be pivoted below the line 55.

As depicted in FIGS. 2–6 a line 55 leads to the line guide 2 from a braked reel 65. The line 55 passes through the tip 25 of the line guide 2 and is moved from the latter to the bell 54, where the line 55 is clamped at the retaining point 61. At this time the loop former 19 is in position C. On pivoting the line guide 2 backwards, clockwise relative to FIG. 1, the line 55 is deflected at the knotting point 60 of the tying head 18 and is raised along the leading edge 40 of the horizontal leg 38 of the deflector 35 to the connecting point 41. In this position, the loop former 19 is pivoted counterclockwise into position D, the line 55 being positioned above the projections 31 of the loop former 19. On further pivoting back the line guide 2 from the retaining point 61, the line drops behind the vertical leg 39 of the thread deflector 35 and remains on the bent down tab 30 of the right-hand sidewall 28.

In this position the loop former 19 is pivoted clockwise over the position C, so that the line 55 is located in the recess 32 of the right-hand sidewall 28. The line guide 2 is now again pivoted in the direction of the bell 54 and consequently counterclockwise in FIG. 1 to the retaining point 61. The line 55 passes along the leading edge 40 of the vertical leg 39 of the thread deflector 35 over the connecting point 41 and along the leading edge 40 of the horizontal leg 38 of the thread deflector 35, the line 55 being placed in the recess 32 of the left-hand sidewall 27. The line 55 is then also guided along the knotting point 60 and clamped at the bell 54. In this way a loop is formed, which is placed externally around the two sidewalls 27 and 28 from the knotting point 60. The tying head 18 can now produce the knot in a manner known to those skilled in the art by a combination of rotary and translatory movements, as well as the sliding of the loop former 19 on the carriage 20' and subsequently the finished loop is cut off with a knife. The loop is then raised from bottom to top out of the recesses 32 by the line remover 44 in the manner shown in FIG. 1 and can be transferred to the gathering plates of the clipper.

It is pointed out that the casing 1 and therefore the entire apparatus need not necessarily be positioned horizontally, in the manner shown in FIG. 1, but can also be positioned vertically under a known sausage clipper.

What is claimed is:

1. An apparatus to operate in cooperation with a stuffed-casing-product-sealing machine, for forming loops in line, the apparatus comprising a base, a line guide, a loop former, a tying head, a deflector and means for moving and coordinating motion of the line guide, loop former, and tying head, wherein:

the line guide carries line and is pivotably mounted to the base for movement among a forward position adjacent the tying head, a partially retracted position, and a fully retracted position away from the tying head;

the tying head is means mounted to the base for clamping line brought to the tying head by the line guide;

the loop former is pivotably mounted to the base for movement among an advanced position wherein line extending between the tying head and the line guide in the fully retracted position of the line guide is engaged by the loop former, and a retracted position;

the deflector is means mounted to the base for deflecting the line out of the path occupied by line extending between the tying head and the line guide, the deflector being positioned in the path of line extending between the tying head and the line guide in the partially retracted position of the line guide;

the tying head also being means for tying a loop; and the means for moving and coordinating motion accomplishing motion such that first, the line guide moves to the advanced position while the loop former is in the retracted position;

second, the line guide moves to the partially retracted position while the deflector deflects the line;

third, the loop former moves to the advanced position adjacent the deflected line;

fourth, the line guide moves to the retracted position causing the line to engage the loop former;

fifth, the loop former returns to the retracted position while engaged with the line and moves the line with the loop former;

sixth, the line guide moves to the advanced position whereby the line extends around the loop former, forming a loop from the tying head around the loop former back to the tying head; and seventh, the tying head ties the loop.

2. An apparatus according to claim 1 wherein the loop former including sidewalls, the sidewalls forming recesses for receipt of line as the line extends around the loop former.

3. An apparatus according to claim 2 wherein the loop former further defines a tab which extends at an angle from one of the sidewalls of the loop former in order to catch and guide the line into the recesses.

4. An apparatus according to claim 1 further comprising a line remover wherein the completed tied loop is removed from the loop forming apparatus by the line remover, the line remover including a ready position wherein the line remover is disengaged from the line and an engaged position wherein the line remover engages and removes the line.

* * * * *